United States Patent Office 3,707,381
Patented Dec. 26, 1972

3,707,381
TREATMENT OF RAW PROTEIN
Kenneth Henry Sharp, 3 Cedar, Southdale Road,
Southdale, Johannesburg, Republic of South Africa
No Drawing. Filed Mar. 12, 1970, Ser. No. 19,111
Claims priority, application Republic of South Africa,
Apr. 29, 1969, 69/2,915
Int. Cl. A23j 1/04
U.S. Cl. 99—18
8 Claims

ABSTRACT OF THE DISCLOSURE

The invention concerns a process for treating a raw protein source, for example fish, to obtain a dry protein concentrate of high biological value. The protein concentrate is ground up, soaked in a weak formaldehyde in water solution, then dried. The product is a concentrate which lacks the offensive odour of many fish meals. Further it is fit for human consumption and can be stored for long periods in a packet on a shelf, i.e. without freezing.

---

This invention relates to an improved process for treating raw protein which results in a stable protein concentrate which can be stored indefinitely at ambient temperatures in tropical and subtropical climates.

At present, for example, the fishing industry off the Southern and South West African coast is hampered by the fact that the fish caught do not stay fresh for any length of time. Also, known processes for producing a protein concentrate from fresh wet fish such as solvent extraction or azeotropic distillation tend to be expensive.

An object of the present invention is to provide a process which the applicant believes has certain advantages over existing processes. For instance the applicant's process allows for storage of fish for long periods at sea thus enabling fishing vessels to stay at sea until their holds are full. Further the applicant's process yields as end product a protein concentrate which can be stored at room temperatures as indicated above. Of importance is the fact that the protein concentrate is fit for human consumption. The process is particularly useful in the fishing industry but is also suitable for the treatment of protein from any other source, for example whale meat, plankton, livestock, game and others.

According to the invention a process for the preparation of a stable protein concentrate from a raw fresh protein source includes the steps of comminuting the raw material, soaking the material in a solution of formaldehyde in water with the formaldehyde added to the water to a concentration of between 0.01% to 1%, removing at least some and preferably most excess solution to yield a slurry, and thereafter treating the slurry to remove the remaining excess moisture.

The preferred treatment of the slurry to remove the remaining excess moisture is to freeze the material in the slurry to a solid state, thaw the frozen material and then remove the resultant excess moisture by mechanical means, for example pressure filtration or a screw press.

The invention is also directed to a process for the treatment of raw fresh protein to allow storage of the protein without freezing, which includes the steps of comminuting the raw material, soaking the material in a solution of formaldehyde in water with the formaldehyde added to the water to a concentration of between 0.01% and 1%, and removing at least some but preferably most of the excess solution to yield a slurry, which is then stored.

According to this aspect of the invention when it is applied to the fishing industry, the first three steps of the process may be carried out on board a vessel at sea. This part of the process results in a sterilised slurry which may be stored in the holds of the vessel for extended periods. Also the vessel when fully loaded will store a greater tonnage of protein since some water in the body of the fish will have been removed already. When the vessel returns to harbour the slurry may be pumped to a plant on or near the wharf where the remainder of the process is carried out.

In the specification the word "comminute" shall include any operation whereby the raw material is broken down to small particles for example grinding, cutting up, mincing, mashing and others.

In order to illustrate the invention a practical embodiment is described below.

The process according to the invention is particularly useful in the fishing industry. For example off the Southern and South-West African coast at present the mean average catch of some types of fish is approximately 40% of the total hold capacity taken over the whole fishing season. By using the process according to the invention it would be possible to approach 100% because the vessels could stay out at sea long enough to fill the holds, without fear of the catch going bad.

The process is as follows:

Freshly caught fish are treated whole or may be deheaded and degutted and washed with fresh water, if required. The fish are passed through a grinder or mincing machine. The fish are all thoroughly ground up and the ground mass is placed in a tank containing 0.1 to 0.5% formaldehyde in water solution at a natural pH. The weight of the solution used should be approximately the same weight as the ground mass of fish. Depending on how finely the fish have been ground the ground mass of fish should be allowed to soak in the solution for one to ten minutes. The more finely the mass of fish is ground, the more efficiently will the solution contact the protein in the ground mass. If the particles are larger it is necessary to allow them to soak for a longer period. Agitation of the ground mass of fish will assist this part of the process.

The formaldehyde solution apart from its action on the protein, acts to sterilise the tank and the ground fish.

The next step is to remove excess solution by decantation or pressure or vacuum filtration or by other conventional means. After removing the excess solution there remains a fish slurry which is sterile and can be stored for lengthy periods in the hold of a trawler or factory ship or on whatever vessel is used for this part of the process. It will be understood that the steps of the process thus far can be carried out conveniently at sea.

The next stage of the process is preferably performed on the shore but could be carried out at sea in a factory ship having the necessary equipment. The slurry is pumped to a plant on or near the wharf. The slurry is then frozen solid at a temperature between −5 and −20° C. This step is important for the process. It is important that all parts of the material in the slurry freeze solid and it is necessary to leave the slurry in this frozen condition for a period between one half an hour and five hours in length. The time period also depends on the coarseness of the grind. For coarser grinds longer periods are required so that the whole mass is frozen solid right through and not just on the outside. It is to be noted that freezing to a slush is not enough.

The next step is to thaw the frozen slurry. The applicant believes that the treatment of the material with formaldehyde solution and subsequent freezing and thawing as described above results in a release of water from the protein. Most of the released water and any other excess moisture is removed by pressure filtration or by using a screw press, pressure filtration, dewatering screens or by other means.

At this stage fats and oils and odoriferous materials may be removed by emulsifying with standard known emulsifiers and removing the emulsified oils and fats and odoriferous materials. Alternatively the fats and oils and odoriferous materials may be removed by using solvent extraction methods with known solvents for fats and oils for example isopropyl alcohol, ethyl alcohol, dichloroethylene, hexane and others.

Finally, if necessary, the product is dried in air by conventional means to a final percentage moisture suitable for storage. Air drying should be done at temperatures below about 50° C. to avoid denaturing of the protein. Other conventional means may be used either with or without the aid of reduced pressures. For example spray drying methods or solvent extraction processes may be used.

Alternatively, the protein may be dried of its moisture first and then have the fats and oils removed.

If desired, the dried protein can be ground further to a fine powder. This results in a dry powdery protein concentrate which is very suitable for human consumption and can be stored in a container for example a polythene bag at ambient temperatures.

The product has not been heated to excess. Heating causes a collapse of the protein fibres into a hard compact mass. The product is of a lower density than that produced by presently known means. Further the colour is markedly whiter than fish meal and fish protein concentrates produced by known processes.

In an alternative form of the invention the first stages of the process are as described above namely, grinding the material, soaking it in a formaldehyde solution, and removing excess solution by some mechanical means, but then instead of freezing and the subsequent steps the slurry is subjected to spray drying thereby removing the remaining excess moisture from the protein.

In one modification the material may be subjected to all the steps described above namely, grinding, mixing with formaldehyde solution, pressing out excess solution, freezing, thawing, again pressing out excess solution and then finally subjecting the material to spray drying. In addition the material may be treated either before or after the final drying stages for the removal of fats and oils and odoriferous materials.

In another modification the material may be steam cooked after it has been thawed.

In yet another modification of the process, instead of freezing and the subsequent steps, the material may be subjected to solvent extraction to remove water from the protein.

With regard to the concentration of the formaldehyde solution the following is to be noted. Depending on the nature of the fresh protein source, the concentration of the formaldehyde solution should be varied. For example for the more tender meats such as chicken, a lower concentration of formaldehyde in water is preferable. So for chicken meat a 0.1% solution of formaldehyde in water is used. If a 0.5% solution is used the protein may tend to be degraded during the subsequent drying process. On the other hand for a tougher meat such as whale meat or horse meat or game the higher concentration is preferable.

The various samples of protein concentrate prepared according to the process of this invention has been subjected to tests which are set out below in the following examples.

EXAMPLE 1

A sample of deheaded and degutted pilchard as caught off the coast of South-West Africa was treated as follows:

The sample was thoroughly ground and a 100 parts by weight of the ground sample was mixed with 200 parts of 0.2% formaldehyde solution. The mixture was stirred for fifteen minutes. Excess solution was removed by squeezing to 50 lbs. per square inch in a pressure filter and the resultant pulp was frozen to minus 10° C. for four hours. The solid frozen mass was thawed to room temperature in warm water and the pulp again squeezed to 50 lbs. per square inch until all excess solution had been removed. This material was then treated with isopropyl alcohol in a refluxing apparatus for three hours and air dried at 50° C. This yielded a dried deodorised fish protein concentrate which was submitted for a nitrogen balance trial. (The usual white rat test.)

The fish protein concentrate was tested together with a standard reference protein of dried defatted whole egg and a series of dried beans.

Tables I, II and III show the results of these tests.

The sample of fish protein concentrate was remarkably free from any fishy flavour and it was impossible to detect any deterioration in the organoleptic properties of a sample kept in a polythene bag at room temperature for about five weeks.

Also, the grittiness usually found in samples of fish flours produced by other processes was not a characteristic of the sample.

TABLE I.—PROTEIN VALUES

| Material | Protein content (N × 6.25) percent (moisture free) | Percent of— | | | |
| --- | --- | --- | --- | --- | --- |
| | | Digestability of protein | Biological value of protein [1] | N.P.U.[2] | N.P.V.[3] |
| Fish protein concentrate | 92.36 | 97.6±0.283 | 88.2±1.944 | 86.1 | 79.5 |
| Beans | 27.01 | 85.6±0.709 | 60.8±1.564 | 52.1 | 14.1 |
| Eggs | 84.91 | 97.4±0.546 | 96.1±1.186 | 93.7 | 79.6 |

[1] Percent utilization of absorbed (digestible) fraction of protein in product.
[2] Percent utilizable protein in protein components of product.
[3] Weight of utilizable protein in 100 parts (by weight) of product on a moisture-free basis.

TABLE II.—GROWTH OF RATS OVER 17 DAYS AND BODY-WATER WEIGHTS AT END OF TRIAL

| Material | Mean weight gain of rats over 17 days (grams) | Mean body-water weight after 17 days of experiment (grams) |
| --- | --- | --- |
| Fish protein concentrate | 23.1 | 49.3 |
| Beans | 7.5 | 38.1 |
| Eggs | 25.1 | 51.2 |

TABLE III.—DATA ON UREA N AND NON-UREA N OUTPUT OF RATS DURING BALANCE PERIOD

| Material | Non-urea urinary N output per 100 g. lean body-weight per 10 days (grams) | Urea urinary N output, per 100 grams of— | | Absorbed dietary N (grams)[1] |
| --- | --- | --- | --- | --- |
| | | Lean weight per 10 days (grams) | Total urinary N (grams) | |
| Fish protein concentrate | 0.182 | 0.250 | 56.0 | 15.1 |
| Beans | 0.211 | 0.590 | 73.5 | 39.7 |
| Eggs | 0.194 | 0.104 | 33.0 | 6.5 |

[1] These figures indicate the extent to which the absorbed protein is wasted through excretion in the urine as urea. The figures are inversely correlated with the biological value of the protein.

EXAMPLE 2.—10 TESTS

The treatment procedure is given in Table I.
The analysis report is given in Table II.

TABLE I.—TREATMENT PROCEDURE

[Tests 1-5 were done using deheaded and degutted pilchard. Tests 7, 9 and 10 were done using mackerel]

| Test No. | Treatment | Weight of product (grams) | Percent of original |
|---|---|---|---|
| 1 | Coarse minced pilchard<br>900 c.c. of 0.2% formalin<br>Stir 15 minutes<br>Pressure filter—3 hours<br>Weight wet fish<br>pH of solution—7.1<br>Room temperature 20° C.<br>Freeze 16 hours −10° C.<br>Thaw and press out solution<br>Stand in hexane 48 hours<br>Press out hexane<br>Air dry hexane at 40° C. to | 440<br><br><br><br>435<br><br><br><br>185<br>185<br><br>80 | 100<br><br><br><br><br><br><br><br>43<br>43<br><br>18 |
| 2 (a) | Fine minced pilchard<br>250 c.c. 0.2% formalin<br>Temperature 8° C.<br>Stir 20 minutes<br>Press out solution<br>210 c.c. 0.2% formalin<br>Stir 15 minutes<br>Press out solution<br>Freeze 16 hours at −15° C.<br>Thaw and press out solution<br>200 c.c. 0.2% formalin<br>pH 1.5<br>Stir 15 minutes<br>Press out solution<br>Freeze 16 hours at −15° C.<br>Thaw and press out solution<br>Stand in hexane, 16 hours<br>Press out hexane<br>Air dry to | 250<br><br><br><br>210<br><br><br>170<br><br>95<br><br><br><br>108<br><br>100<br><br><br>41 | 100<br><br><br><br>84<br><br><br>68<br><br>37<br><br><br><br>43<br><br>40<br><br><br>16 |
| 2 (b) | Fine minced pilchard<br>Soda bicarbonate to pH 8.2<br>500 c.c. 0.2% formalin<br>Stir 15 minutes<br>Temperature 15° C.<br>Press out solution.<br>Freeze 16 hours at −15° C.<br>Thaw and press out solution<br>300 c.c. 0.2% formalin<br>Temperature 35° C.<br>Stir 20 minutes<br>Press out solution<br>200 c.c. 0.2% formalin<br>pH 1.5<br>Stir 2 hours<br>Press out solution<br>Freeze 16 hours at −15° C.<br>Thaw and press out solution<br>Air dry to | 250<br><br><br><br><br>230<br><br>150<br><br><br><br>176<br><br><br><br>100<br><br>91<br>39 | 100<br><br><br><br><br><br><br>60<br><br><br><br>70<br><br><br><br>40<br><br>36<br>16 |
| 3 | Fine minced pilchard<br>500 c.c. 0.5% formalin<br>pH 7.5<br>Stir 15 minutes<br>Press out solution<br>Freeze 16 hours at −15° C.<br>Thaw and press out solution<br>200 c.c. 0.2% formalin<br>pH 1.5<br>Stir 2 hours<br>Press out solution<br>Freeze 16 hours at −15° C.<br>Thaw and press out solution<br>Hexane (1:1) twice and press out hexane.<br>Air dry to | 250<br><br><br><br>195<br><br>130<br><br><br><br>110<br><br>102<br><br><br>48 | 100<br><br><br><br>78<br><br>52<br><br><br><br>44<br><br>41<br><br><br>19 |
| 4 | Fine minced pilchard<br>500 c.c. 0.2% formalin<br>Stir 15 minutes<br>Freeze whole sample 16 hours −15° C.<br>Thaw and press out solution<br>Stand in 1:1 hexane 48 hours<br>Press out hexane<br>Air dry to<br>I.P.A. 1:1 2 hours<br>Filter and air dry to | 250<br><br><br><br>100<br><br>92<br>41<br><br>37 | 100<br><br><br><br>40<br><br>37<br>16<br><br>15 |
| 5 | Fine minced pilchard<br>700 c.c. 0.2% formalin<br>Stir 90 minutes<br>Press out solution<br>Freeze 16 hours at −15° C.<br>Thaw and press out solution<br>Air dry to<br>Split into 5(a) and 5(b). | 700<br><br><br><br><br>308<br>189 | 100<br><br><br><br><br>44<br>27 |
| 5 (a) | Wash in hexane 3 times<br>Air dry to | 100<br>76 | 100<br>21 |
| 5 (b) | As is for analysis | 89 | 27 |
| 7 | Fine minced mackerel agitate in ultrasonic vibrator with hexane (1:1) 10 minutes<br>Press out solution<br>500 c.c. 0.2% formalin<br>Agitate in ultrasonic vibrator 10 minutes<br>Press out solution<br>No prior freezing<br>Freeze 16 hours at −15° C.<br>Thaw and press out solution<br>I.P.A. 1:1 2 hours<br>Press out solution<br>Repeat twice<br>Air dry to<br>(strong emulsion in hexane) | 250<br><br><br><br><br><br>118<br><br><br>78<br><br><br><br>34 | 100<br><br><br><br><br><br>47<br><br><br>32<br><br><br><br>14 |
| 9 | Fine minced mackerel<br>Hexane to fish (2:1) for 3 days<br>Press out hexane<br>650 c.c. 0.2% formalin 2 days<br>Press out solution<br>No freezing<br>Press to 2,000 lbs./sq. in.<br>Air dry to<br>(strong fish smell)<br>I.P.A. twice at 1:1<br>Air dry to | 365<br><br>320<br><br>245<br><br>174<br>73<br><br><br>62 | 100<br><br><br><br>67<br><br>37<br>20<br><br><br>16 |
| 10 | Fine minced mackerel<br>500 c.c. 0.2% formalin<br>Stir 1 hour<br>Press out solution<br>Instant freeze in solid $CO_2$/hexane supercooled liquid<br>(±−60° C. or −80° C.)<br>Thaw 16 hours<br>Press out solution<br>Wash once with hexane<br>Air dry to | 250<br><br><br><br><br><br><br><br><br>50 | 100<br><br><br><br><br><br><br><br><br>25 |

TABLE II.—ANALYSIS REPORT FOR ABOVE TESTS

| Test No. | Percent of— | | | Hexane, fats and oils percent | 95% alcohol fats and oils percent | Protein, fat and water free percent |
|---|---|---|---|---|---|---|
| | Protein (as is) | Moisture | Ash | | | |
| 1 | 81.7 | 9.0 | 5.7 | 0.70 | 5.0 | 95 |
| 2 (a) | 68.3 | 8.3 | 4.1 | 0.90 | 14.8 | 89 |
| 2 (b) | 68.0 | 9.1 | 4.6 | 3.7 | 20.1 | 96 |
| 3 | 71.6 | 9.5 | 4.8 | 1.0 | 12.5 | 92 |
| 4 | 84.2 | 9.2 | 5.9 | 0.30 | 4.3 | [1] 97 |
| 5 (a) | 81.8 | 9.2 | 5.1 | 0.70 | 4.9 | 95 |
| 5 (b) | 69.1 | 8.0 | 5.0 | 13.6 | 17.5 | 93 |
| 7 | 79.4 | 9.6 | 6.3 | 2.7 | 6.0 | 94 |
| 9 | 84.6 | 4.3 | 7.1 | 0.89 | 7.2 | [1] 95 |
| 10 | 80.2 | 9.4 | 6.8 | 3.6 | 8.9 | [1] 99 |

[1] Results are suspect but show that the process has not adversely affected the protein.

What is claimed is:

1. A process for the preparation of a stable protein concentrate from a raw fish protein source, which consists essentially of:

(A) comminuting said raw material, (B) soaking said raw material in a solution of formaldehyde in water to provide a slurry of the protein material, said formaldehyde being present in the solution in an amount ranging from 0.01 to 1.0% by weight, (C) removing at least some and preferably most of the free water of the slurry, (D) freezing the raw material in the slurry to a solid state to permit the formaldehyde to release water from the protein, (E) thawing the frozen material, and (F) treating the thawed material to remove any remaining free water including said water released from said protein.

2. The process of claim 1, wherein free water is removed from the system through spray drying.

3. The process of claim 1, wherein free water is removed from the system through solvent extraction.

4. The process of claim 1, wherein the final step of removing the remaining free water is achieved through spray drying.

5. The process of claim 1, wherein the final step of removing the free water is achieved through cooking the material.

6. The process of claim 1, which includes the step of removing fats and oils and odoriferous materials through solvent extraction.

7. The process of claim 1, which includes the step of removing fats and oils and odoriferous materials through emulsification.

8. The process of claim 3, wherein the solvent employed for the solvent extraction is isopropyl alcohol.

References Cited

UNITED STATES PATENTS

| | | | |
|---|---|---|---|
| 987,868 | 3/1911 | Ellis | 99—222 |
| 2,686,126 | 6/1949 | Lovern | 99—18 |

OTHER REFERENCES

Rose: The Condensed Chemical Dictionary, 1969, p. 429.

Brody: Fishery By-Products Technology, 1965, pp. 209–223.

RAYMOND N. JONES, Primary Examiner

R. B. ANDEWELT, Assistant Examiner

U.S. Cl. X.R.

99—158; 260—112